United States Patent [19]

Ozawa

[11] Patent Number: 4,923,554
[45] Date of Patent: May 8, 1990

[54] FORMING DRUM FOR BUILDING A TIRE

[75] Inventor: Chiaki Ozawa, Kodaira, Japan

[73] Assignee: Bridgestone Corporation, Tokyo, Japan

[21] Appl. No.: 232,748

[22] Filed: Aug. 16, 1988

[30] Foreign Application Priority Data

Aug. 20, 1987 [JP] Japan .................. 62-205053

[51] Int. Cl.⁵ .............................. B29D 30/24
[52] U.S. Cl. ..................... 156/417; 156/126
[58] Field of Search ........... 156/414, 417, 420, 126, 156/124, 130, 133

[56] References Cited

U.S. PATENT DOCUMENTS

| | | | |
|---|---|---|---|
| 3,790,425 | 2/1974 | Leblond | 156/416 |
| 3,932,256 | 1/1976 | Touchette | 156/417 |
| 4,288,265 | 9/1981 | Pacciarini et al. | 156/417 X |

FOREIGN PATENT DOCUMENTS

| | | | |
|---|---|---|---|
| 1175870 | 8/1964 | Fed. Rep. of Germany | 156/417 |
| 57-96840 | 6/1982 | Japan . | |
| 60-128157 | 7/1985 | Japan . | |
| 60-196330 | 10/1985 | Japan . | |
| 1500142 | 2/1978 | United Kingdom . | |

Primary Examiner—Raymond Hoch
Attorney, Agent, or Firm—Sughrue, Mion, Zinn, Macpeak & Seas

[57] ABSTRACT

A forming drum to be used in tire building for forming a strip-like belt member having a steel cord buried therein into an annular shape. The forming drum includes a plurality of segments divided in the circumferential direction and made of non-magnetic material, which form substantially cylindrical shapes having different outer diameters as moved in the radial direction, and permanent magnet are buried in the circular arc-shaped surfaces of the segments. Between adjacent segments are mounted cover plates made of non-magnetic material, and a cylindrical outer circumferential surface is formed by these cover plates. Each cover plate is fixedly secured to the circular arc-shaped surface of one of the adjacent segments.

7 Claims, 4 Drawing Sheets

FORMING DRUM FOR BUILDING A TIRE

BACKGROUND OF THE INVENTION

The present invention relates to a forming drum for building a tire, and more particularly, to a tire belt forming drum for forming a strip-like belt member having a steel cord buried therein into an annular shape.

Generally, a belt forming drum has such structure that a diameter of an outer circumferential surface of a cylinder onto which a strip-like belt member is to be stuck can be arbitrarily varied so that a formed annular belt of various sizes may be obtained. More particularly, as shown in FIG. 4, a belt forming drum is composed of a plurality of segments 01 severed in the circumferential direction, and as a result of movement of these segments in the radial direction, the outer diameter of the cylinder expands or collapses. In order to cover the gaps between the segments upon expansion, heretofore an annular rubber band 02 was provided so as to surround the outer circumference of the cylinder.

However, the rubber band 02 has a limit in elongation, and so, with only one kind of rubber band, the size of the annular belt that can be formed is extremely limited. Therefore, the scope of the applicable forming size was enlarged by preliminarily preparing a several kinds of rubber bands having different circumferential lengths and making use of them selectively according to necessity.

But, such type of rubber bands are manufactured to be relatively thin in order to increase an expanding/collapsing proportion, hence the work of replacing the rubber band is very difficult, and especially the rubber band replacement work on a belt forming drum for forming a large-sized tire was a laborious time-consuming work. With regard to a sticking position of a belt member onto a drum also, since there is no way for positively fixing a belt member to segments, there was inconvenience that a sticking position of a belt member was displaced in the course of sticking or an annular belt was disengaged from a drum due to rotation of the drum after sticking.

Since a rubber band has a tendency of gradually elongating while it is used, there was also an inconvenience that when a forming drum is collapsed in diameter and a formed annular belt is withdrawn therefrom, a rubber band elongated longer than the circumferential length of the forming drum when it has the minimum diameter, would be withdrawn together with the annular belt. Furthermore, in the event that a rubber band should be damaged, there was a fear that the rubber might be suddenly broken during expansion of a drum.

Since the forming drum provided with a rubber band surrounding the outside of a plurality of segments is accompanied by the above-mentioned shortcomings, a forming drum not making use of a rubber band was proposed in U.S. Pat. No. 3,932,256. FIGS. 5a, 5b, 5c, are partial cross-section views respectively showing an expanded (the maximum diameter) condition E, an intermediate condition I and a collapsed (the minimum diameter) condition C of the proposed forming drum, wherein reference numerals 01a and 01b indicate two adjacent segments. Between the segments 01a and 01b is provided a cover plate 02a slightly bent at its center, and a part of the cover plate 02a on the side of the segment 01a is fixedly secured to the outer surface of the segment 01a by means of a flat head screw 03. The other end of the cover plate 02a is overlapped on the segment 01b. To the segment 01b is also fixedly secured a similar cover plate 02b.

The respective segments are movable in the radial direction, and under the collapsed condition illustrated in FIG. 5c, the segments come so close to one another that they nearly come into contact with one another to reduce the outer diameter of the drum. At this time, the cover plate 02a would deeply overlap on the surface of the segment 01b to form a nearly cylindrical outer circumferential surface.

If the segments are moved radially outwards from this collapsed condition, then they take an intermediate condition shown in FIG. 5b. Under this condition, although the segments 1a and 1b are separated from one another, the cover plates 02a cover the gap spaces therebetween and would form an almost smooth cylindrical outer circumferential surface.

If the segments are further moved radially outwards from this intermediate condition, then the expanded condition shown in FIG. 5a is realized, where an also smooth cylindrical outer circumferential surface having the maximum outer diameter can be formed. In this way, the outer diameter of the drum can be arbitrarily varied from the condition where the segments are placed close to one another, up to the external condition where the free end portions of the cover plates can overlap on the outer surfaces of the adjacent segments, and in the course of the variation a nearly smooth cylindrical outer circumferential surface can be formed.

A strip-like belt is wound around the thus formed cylindrical outer circumferential surface, stuck there and brought into tight contact with the drum, and thereby an annular belt having a desired size can be formed. However, there is no means for positively bringing the strip-like belt into tight contact with the drum, but only the stickiness of rubber forming the strip-like belt is relied upon. Accordingly, when the strip-like belt is wound around the forming drum, an inconvenience that a small gap space may be produced between the cylindrical outer circumferential surface of the drum and the belt member and hence the opposite ends of the belt member upon finishing of the winding may not coincide with each other, resulting in a gap space therebetween, is liable to occur.

SUMMARY OF THE INVENTION

It is therefore one object of the present invention to provide a forming drum which makes it possible to easily form a desired annular belt by bringing a strip-like belt member having a steel cord buried therein into tight contact with the drum.

To that end, according to the present invention, in a forming drum for building a tire which forms a strip-like belt member consisting of a rubber-coated steel cord into an annular belt, and which comprises a plurality of segments divided in the circumferential direction and adapted to form substantially cylindrical shapes having different outer diameters as moved in the radial direction, the aforementioned plurality of segments are formed of non-magnetic material, permanent magnets are buried in the circular arc-shaped surfaces of these segments, cover plates made of non-magnetic material are respectively mounted between adjacent ones of the segments to form a cylindrical outer circumferential surface by these cover plates and each of the cover plates is fixedly secured to the circular arc-shaped surface of corresponding one of the segments.

Since every cover plate having one end fixedly secured to the circular arc-shaped surface of the corresponding segment has the other end extended up to the adjacent segment to form a continuous cylindrical outer circumferential surface, the outer diameter of the forming drum can be enlarged or reduced within the range where the cover plate can bridge the adjacent segments. In addition, since permanent magnets are buried in the circular arc-shaped surface of the segment made of non-magnetic material, the strip-like belt member having a steel cord buried therein is brought into tight contact with the drum via the above-mentioned cover plates due to magnetic forces of the above-described permanent magnets. Accordingly, it would never occur that a gap space is produced between the outer surface of the drum and the belt member or a displacement is produced in sticking of the belt member onto the outer surface of the drum. Hence a desired size of annular belts can be easily and accurately formed.

DETAILED DESCRIPTION OF THE PREFERRED EMBODIMENTS

Figure 1:
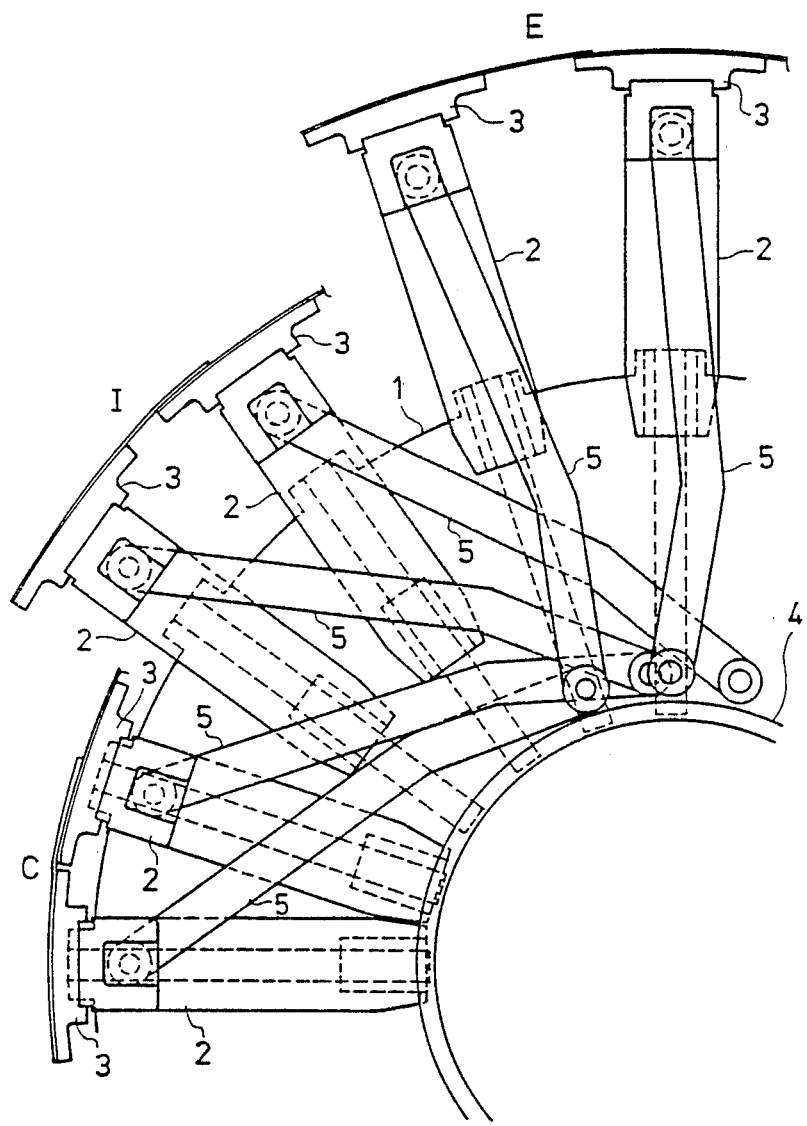
FIG. 1 is a partial side view of a belt forming drum according to one preferred embodiment of the present invention, in which three sets of segments are held under a collapsed condition, under an intermediate condition, and under an expanded condition, respectively.

FIG. 1 is a side view showing a part of a forming drum according to the present invention. Slide members 2 are supported in a radially slidable manner in radial slots formed in a cylindrical support member 1 at equal intervals in the circumferential direction. At the tip end of the slide member 2 a circular arc-shaped segment 3 made of non-magnetic material such as aluminum or the like, is fixed. On the support member 1 are provided, for example, forty slide members 2. As a result of these slide members sliding uniformly in the radial direction, the outer circumferential surfaces of the above-mentioned segments 3 form various cylindrical surfaces having different outer diameters. In FIG. 1, reference character C designates the condition of adjacent two segments 3 where the outer diameter of the above-mentioned cylindrical surface has become minimum. At this moment, the respective segments 3 come close to each other, and one-twentieth of the circumferential surface of the collapsed cylinder is formed by these two segments.

Outer ends of links 5 are pivotably mounted respectively to the vicinities of the tip ends of the respective slide members 2, and the inner ends of these links 5 are pivotably supported in sequence along one concentric circle on a base 4 having a smaller diameter than the above-mentioned cylindrical support member 1. Accordingly, as a result of relative rotation of the base 4 with respect to the cylindrical support member 1, the slide member 2 is made to slide in the radial direction by the intermediary of the links 5. Under the collapsed condition C, the links 5 take a fallen state, but under the intermediate condition I, the links 5 take a somewhat rising state, and under the expanded condition E, the links 5 are almost perfectly rising and the slide members 2 would be positioned nearly along the radii passing through the pivotal support portions at the base ends of the links 5.

Figure 2:
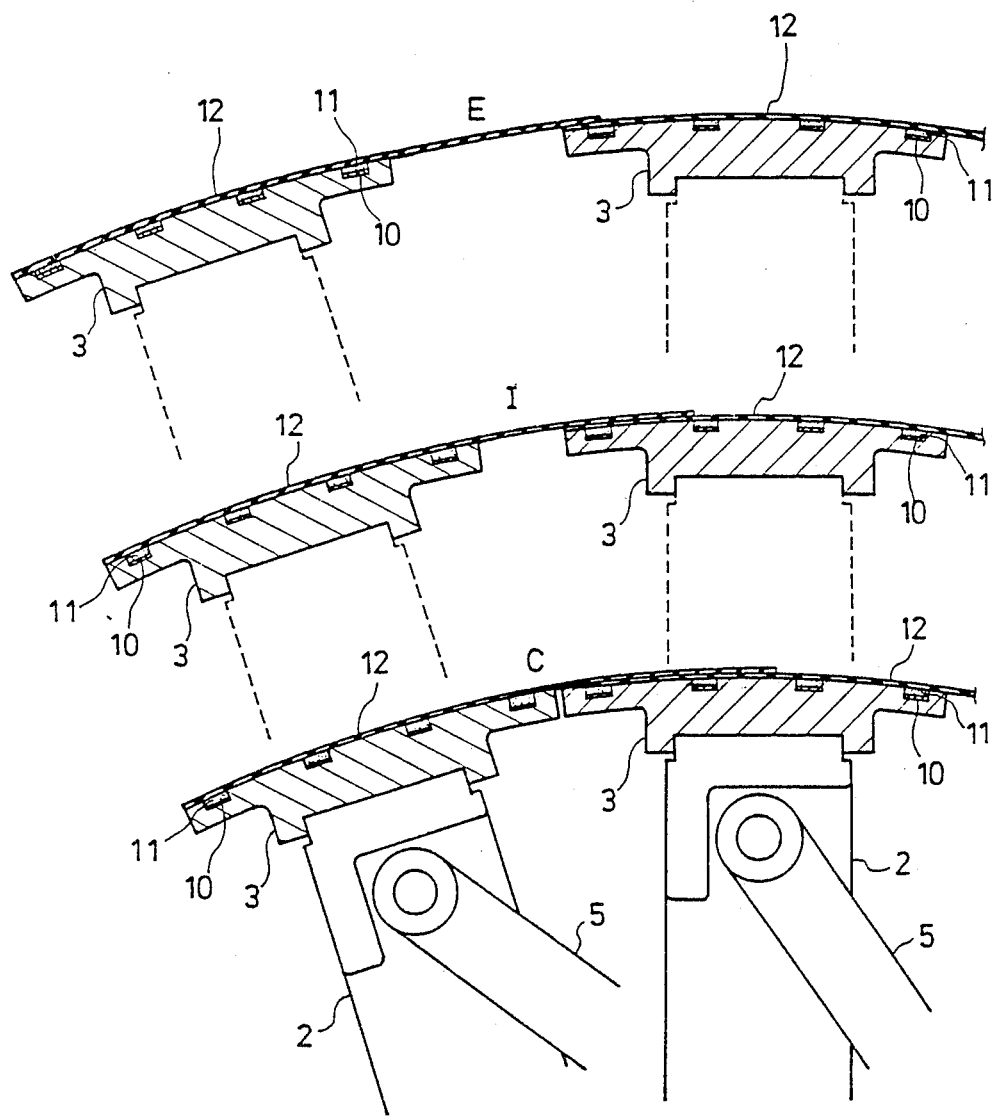
FIG. 2 is an enlarged cross-section view showing the respective conditions above of one set of segments.
Figure 3:
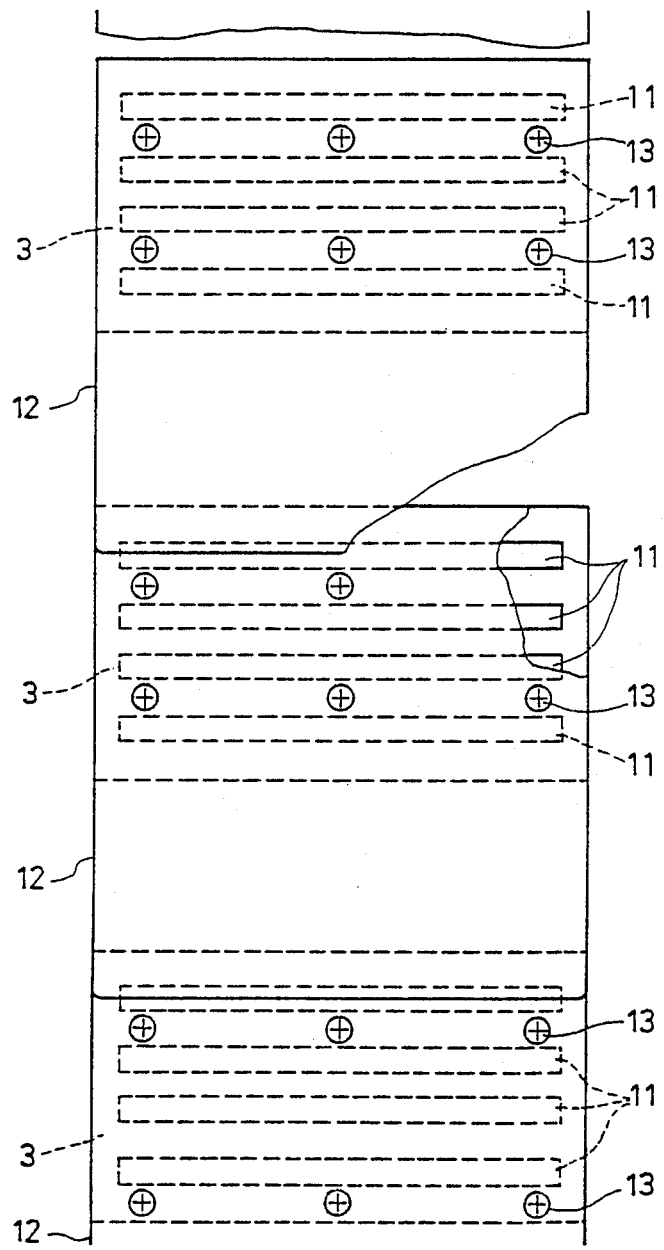
FIG. 3 is a developed view of a circumferential surface of a drum.
Figure 4:
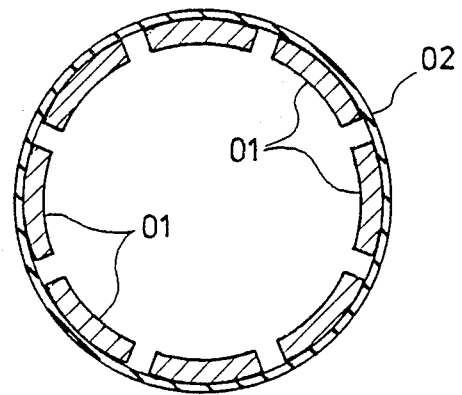
FIG. 4 is a transverse cross-section view of a forming drum in the prior art.
Figure 5A:
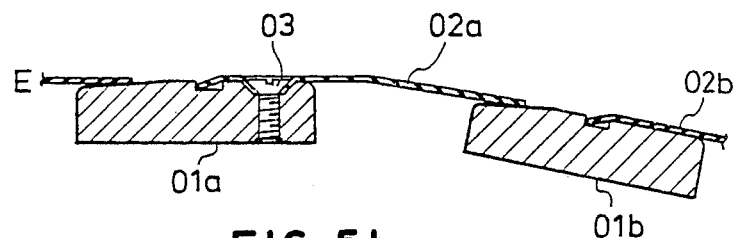
FIGS. 5a to 5c are partial transverse cross-section views showing the respective conditions of a forming drum in another example of the prior art.
Figure 5B:
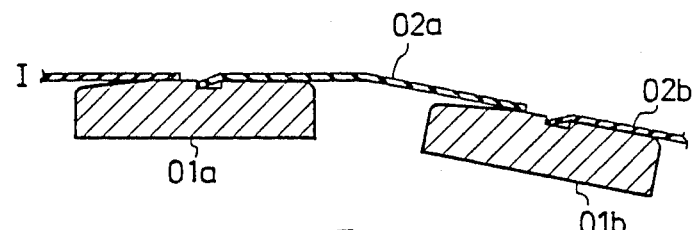
Figure 5C:
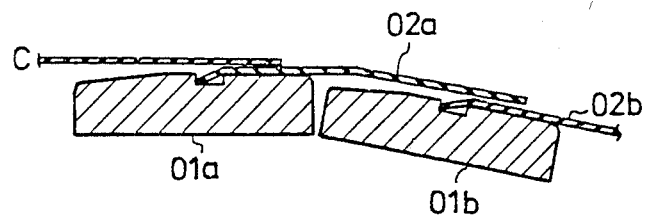

FIG. 2 is an enlarged cross-section view showing the segment portions under the collapsed, intermediate and expanded conditions, respectively, and FIG. 3 is a developed view of a drum circumferential surface under the expanded condition. On the circular arc-shaped surface of the segment 3 are formed a plurality of grooves directed in the axial direction, and in these grooves are fitted permanent magnets 11 with iron plates 10 laid thereunder. The circular arc-shaped surfaces of the thus formed segments 3 are covered by cover plates 12 consisting of thin plates made of non-magnetic material such as stainless steel or the like.

The cover plate 12 is subjected to press working so as to maintain a circular arc-shape, and a front half portion thereof covers the segment 3 and also is fixedly secured to the circular arc-shaped surface of the segment 3 by means of flat head screws 13. The rear half portion of the cover plate 12 forms a free end portion and bridges the next adjacent segment 3. It is overlapped on the front half portion of the cover plate 12 fixedly secured to this adjacent segment 3.

The cover plate 12 is press-worked in such manner that the circular arc-shape of the pressed cover plate may coincide with the configuration of the drum circumferential surface under the collapsed condition C. In the collapsed condition C, the free end portion of the cover plate 12 covers more than one-half of the circular arc-shaped surface of the adjacent segment 3, and is held in tight contact with the cover plate 12 fixedly secured onto the adjacent segment 3.

If the segments 3 slide in the radially outward direction starting from this collapsed condition, then the diameter of the drum becomes larger, and the intermediate condition I is attained. At this time, while the gap space between the adjacent segments 3 is broadend, the cover plate 12 can cover the broadened gap space to form a continuous cylindrical outer circumferential surface. If the segments 3 slide further in the radially outward direction, then the expanded condition E is attained. In this expanded condition, the free end portion of the cover plate 12 overlaps on the surface of the adjacent segment 3 to a certain extent to cover the gap space between the adjacent two segments 3.

Since the cover plate 12 is preliminarily given permanent warp by press-working so that the radius of curvature thereof may coincide with the radius of curvature under the collapsed condition C, under the intermediate condition I and the expanded condition E, the cover plate 12 would be subjected to elastic deformation, resulting in increase of the radius of curvature, accordingly the free end portion of the cover plate 12 is pressed on the cover plate 12 fixedly secured to the next adjacent segment 3 due to elasticity thereof, and thereby a tight contact condition can be always maintained between the adjacent cover plates 12.

As the illustrated embodiment is constructed as described above, the outer diameter of the forming drum can be arbitrarily varied over a wide range from the collapsed condition C up to the expanded condition E, and under any condition, always a continuous cylindrical outer circumferential surface can be formed easily.

In addition, the permanent 11 buried in the surface of the segment 3 has its magnetic force increased by the iron plate 10, and attracts the strip-like belt member having a steel cord buried therein and placed on the cover plate 12. Accordingly, when the strip-like belt member is wound around the forming drum, the strip-like belt member is brought into tight contact with the cover plate 12 without forming a hollow space therebetween, and so, at the time point when the belt member has finished to be wound, the front edge and the rear edge of the strip-like belt member preliminarily cut into a predetermined size can precisely coincide with each other. Also, displacement of the strip-like belt member with respect to the drum would not arise, and an annular belt can be easily formed at a high precision.

The annular belt after formation also can be held stuck to the drum strongly by the magnetic forces of the permanent magnets 11. Thus, this annular belt would not be displaced with respect to the drum. As the cover plate 12 itself is made of non-magnetic material, it would not be directly attracted to the strip-like belt, and hence, when the formed annular belt is taken out, the magnetic force would not obstruct the take-out operation.

What is claimed is:

1. A forming drum for building a tire to form a strip-like belt member comprising a rubber-coated steel cord into an annular belt, said drum comprising; a plurality of segments divided in the circumferential direction and adapted to form substantially cylindrical shapes having different outer diameters as moved in the radial direction; said plurality of segments formed of non-magnetic material, permanent magnets buried in arc-shaped outer surfaces of said segments; cover plates made of non-magnetic material respectively mounted between adjacent ones of the segments to form a cylindrical outer circumferential surface, and each of said cover plates fixedly secured to the arc-shaped outer surface of the corresponding one of the segments to form a continuous covering over said permanent magnets buried in said segments irrespective of any radial movement of said segments.

2. A forming drum as claimed in claim 1, wherein a magnetic material is interposed between said permanent magnet and said segment.

3. A forming drum as claimed in claim 2, wherein said magnetic material is an iron plate.

4. A forming drum as claimed in claim 2 or 3, wherein grooves directed in the axial direction are formed in the circular arc-shaped surface of said segment, and said permanent magnets are fitted in said grooves with said magnetic material laid thereunder.

5. A forming drum as claimed in claim 1, wherein said segments are made of aluminum.

6. A forming drum as claimed in claim 1, wherein said cover plates are made of stainless steel.

7. A forming drum as claimed is claim 1 or 6, wherein said cover plates are press-worked into a circular arc-shape having a radius of curvature which coincides with the radius of curvature of the drum circumferential surface under the collapsed condition of the drum.

* * * * *